United States Patent
Merlin et al.

(10) Patent No.: US 10,021,599 B2
(45) Date of Patent: Jul. 10, 2018

(54) CHANNEL AND BANDWIDTH SWITCH PROCEDURES FOR WIRELESS NETWORKS

(71) Applicant: QUALCOMM Incorporated, San Diego, CA (US)

(72) Inventors: Simone Merlin, San Diego, CA (US); Youhan Kim, Albany, CA (US); Albert van Zelst, Woerden (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/622,845

(22) Filed: Sep. 19, 2012

(65) Prior Publication Data

US 2013/0070701 A1    Mar. 21, 2013

Related U.S. Application Data

(60) Provisional application No. 61/537,018, filed on Sep. 20, 2011.

(51) Int. Cl.
*H04W 28/20* (2009.01)
*H04W 74/00* (2009.01)

(52) U.S. Cl.
CPC ......... *H04W 28/20* (2013.01); *H04W 74/002* (2013.01)

(58) Field of Classification Search
CPC ...... H04B 1/1036; H04B 1/0021; H04B 1/44; H04B 1/401; H04B 7/0452; H04L 5/001;
(Continued)

(56) References Cited

U.S. PATENT DOCUMENTS 6,985,465 B2    1/2006 Cervello et al.
7,327,763 B2    2/2008 Ophir et al.
(Continued)

FOREIGN PATENT DOCUMENTS

CN    101371514 A    2/2009
JP    2009521896 A    6/2009
(Continued)

OTHER PUBLICATIONS

Stacey et al., IEEE P802.11, Specification Framework for TGac, IEEE TGac, doc.: IEEE 802.11-09/0992r21, Jan. 19, 2011.*
(Continued)

*Primary Examiner* — Eric Nowlin
(74) *Attorney, Agent, or Firm* — Patterson & Sheridan, LLP

(57) ABSTRACT

Certain aspects of the present disclosure generally relate to apparatus and methods for switching operating bandwidth and/or operating channel in a wireless communications network. A transmitting STA may send an announcement of a switch to a particular bandwidth in a frame, wherein the presence or absence of a Secondary Channel Offset Element and a Wide Bandwidth Channel Switch Element in the frame indicates whether the particular bandwidth belongs to a first or second set of operating bandwidths. The presence of the Secondary Channel Offset Element and a Wide Bandwidth Channel Switch Element in the frame may indicate a switch to the first set of operating bandwidths. The first set of operating bandwidths may include VHT channels including 80 MHz only, 80+80 MHz and 160 MHz channels. The absence of the Secondary Channel Offset Element and a Wide Bandwidth Channel Switch Element in the frame may indicate a switch to the second set of operating bandwidths. The second set of operating bandwidths may include 20 MHz and 40 MHz channels.

32 Claims, 5 Drawing Sheets

(58) Field of Classification Search
CPC . H04L 5/0044; H04L 5/0073; H04L 41/0896; H04L 47/10; H04L 1/0025; H04W 24/02; H04W 28/18; H04W 28/20; H04W 28/08; H04W 28/02; H04W 40/246; H04W 48/16; H04W 48/18; H04W 72/0453; H04W 72/02; H04W 72/042; H04W 74/0816; H04W 76/02; H04W 76/04; H04W 84/12; H04W 72/0406; H04W 88/08; H04W 72/04; H04J 3/1694
USPC ....... 370/329, 252, 338, 311, 328, 344, 277, 370/310, 468
See application file for complete search history.

(56) References Cited

U.S. PATENT DOCUMENTS

| | | | | |
|---|---|---|---|---|
| 7,352,728 | B2 | 4/2008 | Soomro | |
| 8,417,253 | B2* | 4/2013 | Gong | H04L 5/003 455/450 |
| 2004/0151109 | A1* | 8/2004 | Batra | H04B 1/7163 370/208 |
| 2010/0272058 | A1* | 10/2010 | Solomon et al. | 370/329 |
| 2010/0278166 | A1 | 11/2010 | Seok et al. | |
| 2011/0096747 | A1 | 4/2011 | Seok | |
| 2011/0116488 | A1* | 5/2011 | Grandhi | H04B 7/0626 370/338 |
| 2012/0026997 | A1* | 2/2012 | Seok | H04L 5/001 370/338 |
| 2012/0113806 | A1* | 5/2012 | Gong et al. | 370/230 |
| 2012/0140646 | A1* | 6/2012 | Stephens | H04W 16/14 370/252 |
| 2012/0157151 | A1* | 6/2012 | Chu | H04W 52/40 455/522 |
| 2014/0095755 | A1* | 4/2014 | Gao | G06F 13/387 710/303 |
| 2015/0249990 | A1* | 9/2015 | Kadiyala | H04W 72/085 370/252 |
| 2016/0007247 | A1* | 1/2016 | Lee | H04W 36/0066 370/331 |
| 2017/0180088 | A1* | 6/2017 | Adachi | H04W 48/10 |

FOREIGN PATENT DOCUMENTS

| | | | | |
|---|---|---|---|---|
| WO | 2011060175 | A1 | 5/2011 | |
| WO | WO-2011060156 | A1 | 5/2011 | |
| WO | WO-2014142459 | A1 * | 9/2014 | ........ H04W 36/0066 |
| WO | WO-2016088726 | A1 * | 6/2016 | ............ H04W 48/10 |

OTHER PUBLICATIONS

Hart, IEEE P802.11, Common Resolution, IEEE TGac, doc:IEEE 802.11-11/0954r0, Jul. 2011.*
Bo, IEEE P802.11, VHT Operation Information Subfields, IEEE TGac, doc:IEEE 802.11-11/1048r0, Jul. 2011.*
Hart, IEEE P802.11, D1 Comment Resolution, IEEE TGac, doc:IEEE 802.11-11/1078r0, Jul. 2011.*
Hart, IEEE P802.11, D1 Comment Resolution, IEEE TGac, doc.: IEEE 802.11-11/1216r1, Jul. 2011.*
IEEE, IEEE Standard 802.11n—2009, Part 11, Wireless LAN Medium Access Control (MAC) and Physical Layer Specifications; IEEE, 2009, p. 1-93.*
Lee et al., doc. : IEEE 802.11-11/0305r0, Comment Resoultion for VHT Channel Switch Announcement, IEEE, Mar. 2011.*
Lee et al., Comment Resolution for VHT Channel Switch Announcement, Mar. 2011, IEEE, doc: IEEE 802.11-11/0305r0 (Year: 2011).*
Stacey, LB188 Operating Mode Comment Resolution, Jul. 2012, IEEE, doc: IEEE 802.11-12/0802r0 (Year: 2012).*
Daewon Lee (LG Electronics): "Comment Resolution—Channel Switch Announcement; 11-11-0305-00-00ac-comment-resolution-channel-switch-announcement", IEEE Draft; 11-11-0305-00-00AC-Comment-Resolution-Channel-Switch-Announcement, IEEE-SA Mentor, Piscataway, NJ USA, vol. 802.11ac1, Mar. 14, 2011 (Mar. 14, 2011), pp. 1-6, XP017675185, [retrieved on Mar. 14, 2011].
International Search Report and Written Opinion—PCT/US2012/056367—ISA/EPO—dated Feb. 5, 2013.
Simone Merlin (Qualcomm Inc): "Comment resolutions on BSS BW operation ; 11-11-1186-01-00ac-comment-resolutions-onbss-bw-operation", IEEE Draft; 11-11-1186-01-00AC-Comment-Resolutions-On-BSS-BW-Operation, IEEE-SA Mentor, Piscataway, NJ USA, vol. 802.11ac, No. 1, Sep. 22, 2011 (Sep. 22, 2011), pp. 1-4, XP017673742, [retrieved on Sep. 22, 2011].
Stacey R., et al., "Proposed TGac Draft Amendment", IEEE802.11-10/1361r1, Nov. 8, 2010 (Nov. 8, 2010), pp. 1-130, XP002675587, Retrieved from the Internet: URL:https://mentor.ieee.org/802.11/dcn/10/11-10-1361-02-00ac-proposed-tgac-draft-amendment.docx [retrieved on May 9, 2012] p. 64, line 8-line 9 p. 66, line 5-line 6 paragraph [22.3.9.2.3] p. 80, line 2.
Lee D., et al., "Comment Resolution for VHT Channel Switch Announcement," IEEE 802.11-11/0305r1, Mar. 2011, pp. 5.
Rison M., "LB188 (D3.0) resolution for regulatory generalisation," IEEE 802.11-12/1037r2, Sep. 2012, pp. 136-138.

* cited by examiner

CHANNEL AND BANDWIDTH SWITCH PROCEDURES FOR WIRELESS NETWORKS

CLAIM OF PRIORITY UNDER 35 U.S.C. § 119

The present application for patent claims priority to U.S. Provisional Application No. 61/537,018, entitled "CHANNEL AND BANDWIDTH SWITCH PROCEDURES FOR WIRELESS NETWORK," filed Sep. 20, 2011, and assigned to the assignee hereof and hereby expressly incorporated by reference herein.

BACKGROUND

Field

Certain aspects of the present disclosure generally relate wireless communications, and more particularly to apparatus and methods for switching channel and/or bandwidth in a wireless network.

Background

In order to address the issue of increasing bandwidth requirements in demand for wireless communications systems, different schemes are being developed to allow multiple user terminals to communicate with a single access point by sharing channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The IEEE 802.11 WLAN standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for wireless communication. The apparatus generally includes circuitry configured to prepare for a switch to a particular bandwidth, and a transmitter configured to transmit an announcement of the switch in a frame, wherein the presence of a Secondary Channel Offset Element and a Wide Bandwidth Channel Switch Element in the frame indicates that the particular bandwidth belongs to a first set of operating bandwidths, and wherein the absence of the Secondary Channel Offset Element and the Wide Bandwidth Channel Switch Element in the frame indicates that the particular bandwidth belongs to a second set of operating bandwidths.

Certain aspects of the present disclosure provide a method for wireless communications. The method generally includes preparing for a switch to a particular bandwidth, and sending an announcement of the switch in a frame, wherein the presence of a Secondary Channel Offset Element and a Wide Bandwidth Channel Switch Element in the frame indicates that the particular bandwidth belongs to a first set of operating bandwidths, and wherein the absence of the Secondary Channel Offset Element and the Wide Bandwidth Channel Switch Element in the frame indicates that the particular bandwidth belongs to a second set of operating bandwidths.

Certain aspects of the present disclosure provide an apparatus for wireless communications. The apparatus generally includes means for preparing for a switch to a particular bandwidth, and means for sending an announcement of the switch in a frame, wherein the presence of a Secondary Channel Offset Element and a Wide Bandwidth Channel Switch Element in the frame indicates that the particular bandwidth belongs to a first set of operating bandwidths, and wherein the absence of the Secondary Channel Offset Element and the Wide Bandwidth Channel Switch Element in the frame indicates that the particular bandwidth belongs to a second set of operating bandwidths.

Certain aspects of the present disclosure provide a computer program product for wireless communications. The computer program product generally includes a computer-readable medium having codes executable by a processor for preparing for a switch to a particular bandwidth, and sending an announcement of the switch in a frame, wherein the presence of a Secondary Channel Offset Element and a Wide Bandwidth Channel Switch Element in the frame indicates that the particular bandwidth belongs to a first set of operating bandwidths, and wherein the absence of the Secondary Channel Offset Element and the Wide Bandwidth Channel Switch Element in the frame indicates that the particular bandwidth belongs to a second set of operating bandwidths.

Certain aspects of the present disclosure provide an access point for wireless communications. The access point generally includes at least one antenna, a circuit configured to prepare for a switch to a particular bandwidth, and a transceiver configured to transmit an announcement of the switch in a frame, wherein the presence of a Secondary Channel Offset Element and a Wide Bandwidth Channel Switch Element in the frame indicates that the particular bandwidth belongs to a first set of operating bandwidths, and wherein the absence of the Secondary Channel Offset Element and the Wide Bandwidth Channel Switch Element in the frame indicates that the particular bandwidth belongs to a second set of operating bandwidths.

Certain aspects of the present disclosure provide various apparatus capable of performing one or more of the methods described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
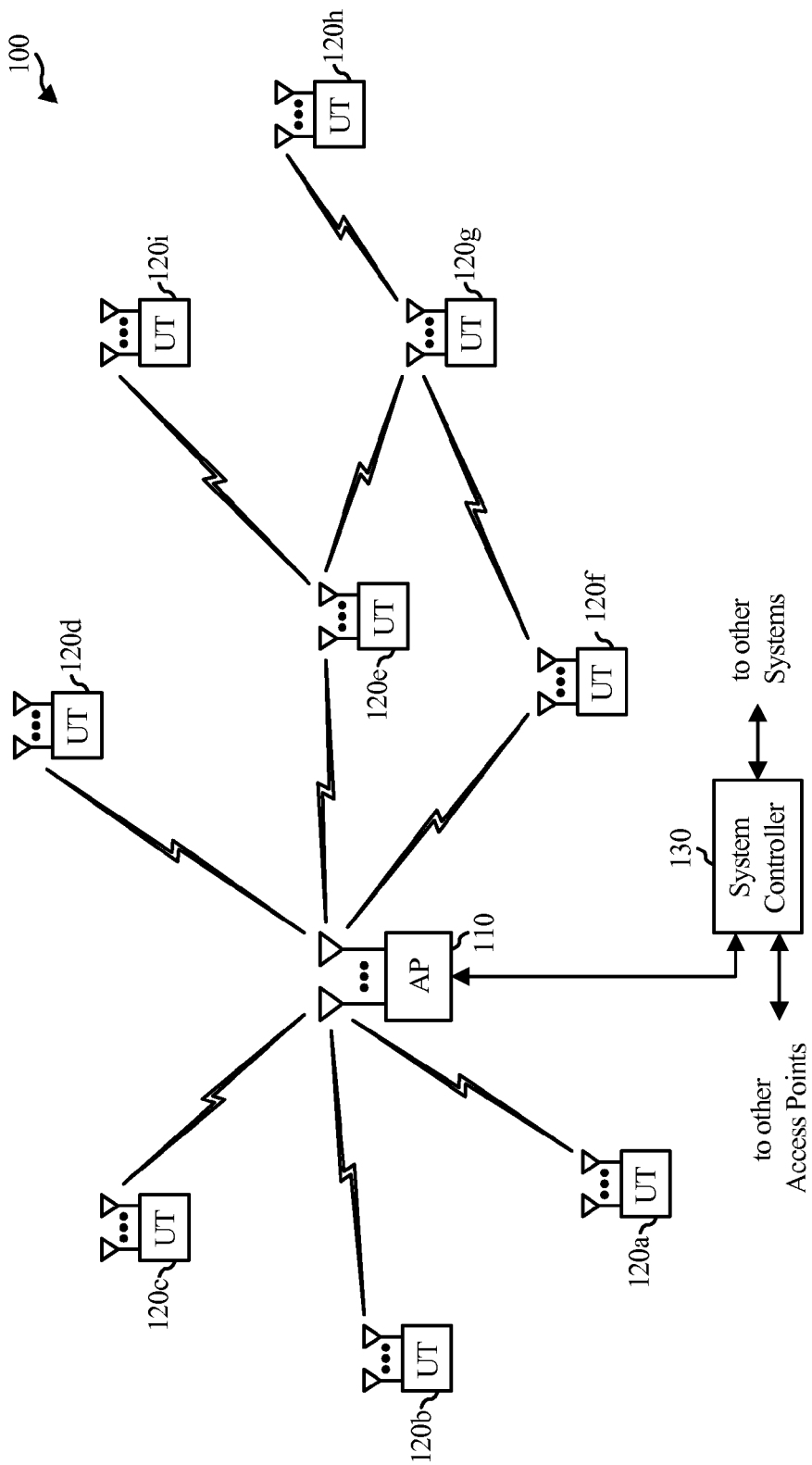
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

The wireless system 100 illustrated in FIG. 1 may operate in accordance with IEEE 802.11ac wireless communications standard. The IEEE 802.11ac represents a new IEEE 802.11 amendment that allows for higher throughput in IEEE 802.11 wireless networks. The higher throughput may be realized through several measures such as parallel transmissions to multiple stations (e.g., user terminals 120) at once, or by using a wider channel bandwidth (e.g., 80 MHz or 160 MHz). The IEEE 802.11ac is also referred to as Very High Throughput (VHT) wireless communications standard.

Figure 2:
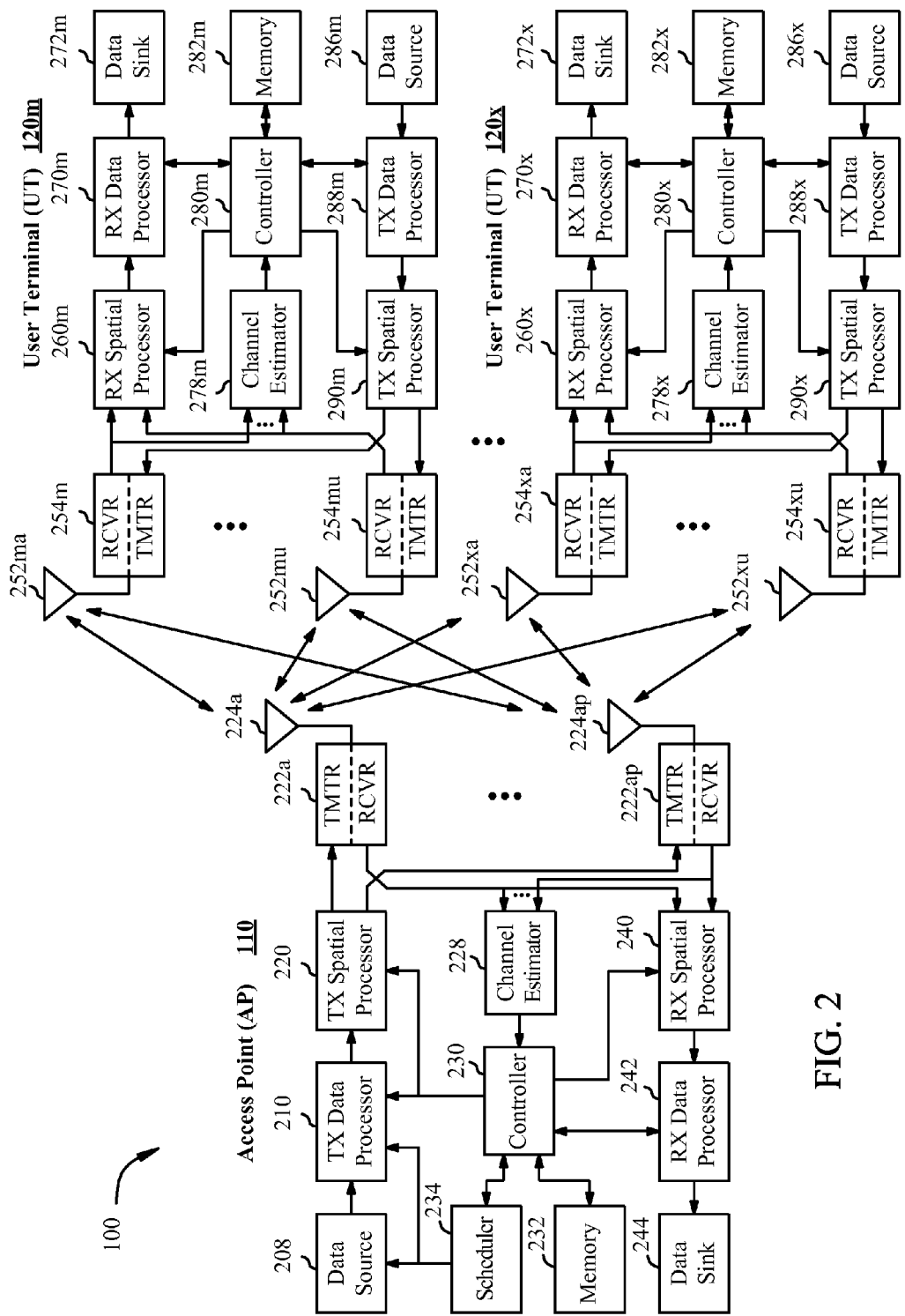
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the modulation and coding schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Certain aspects of the present disclosure support managing acknowledgement messages transmitted from multiple user terminals 120 in response to multi-user multiple-input multiple-output (MU-MIMO) transmissions from an access point 110. According to certain aspects, a polled block acknowledgement (BA) mechanism can be considered mandatory to an acknowledgement (ACK) protocol, and a sequential (or other type of scheduled/deterministic) mechanism can be considered optional.

Figure 3:
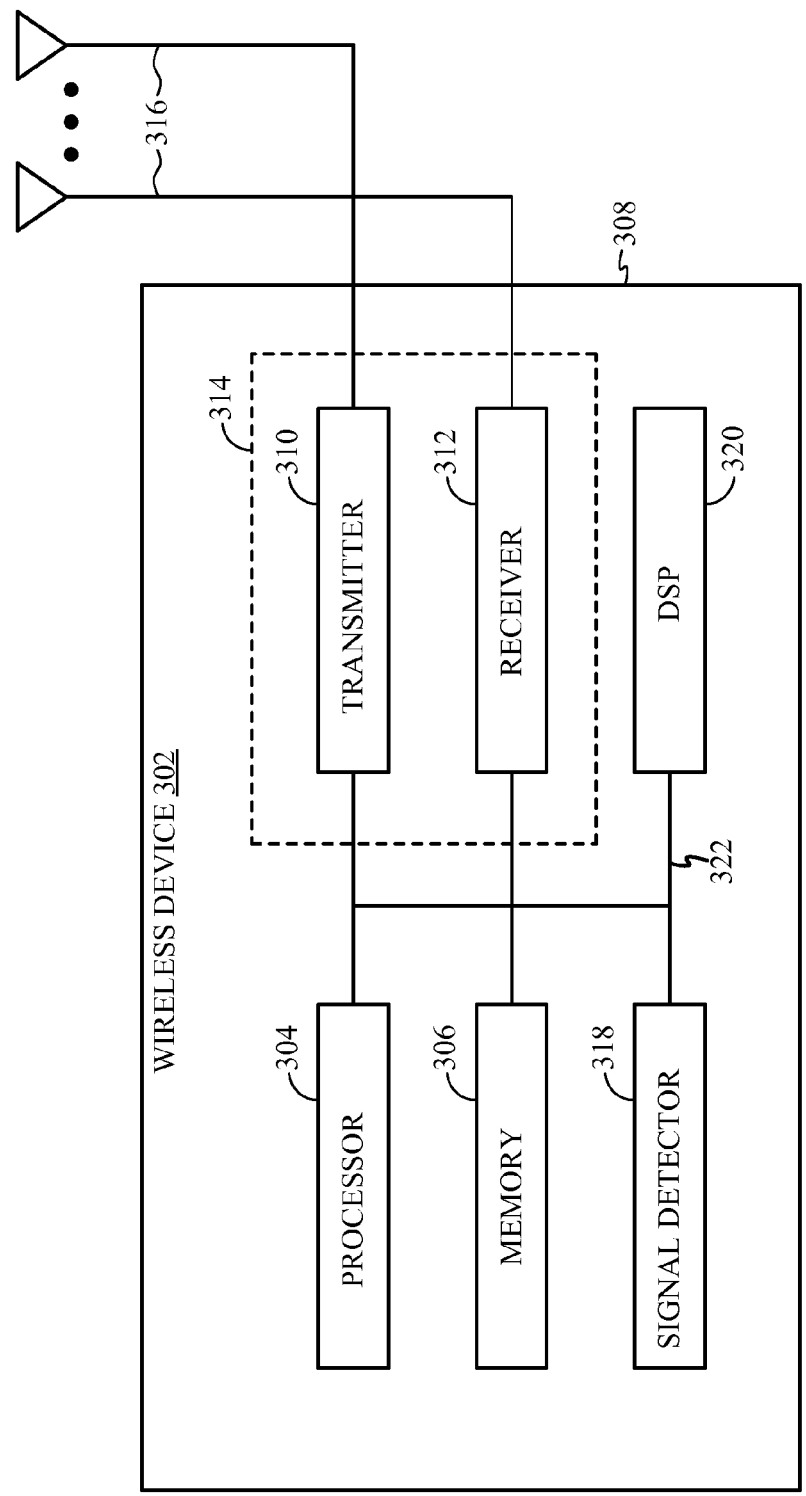
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The present disclosure support managing ACK messages transmitted from the wireless device 302 in response to MU-MIMO transmissions from an access point (not shown in FIG. 3) serving the wireless device 302. The wireless device 302 may correspond to one of user terminals receiving the MU-MIMO transmission. According to certain aspects, a polled BA mechanism can be considered mandatory to an ACK protocol, and a sequential (or other type of scheduled/deterministic) mechanism can be considered optional.

The various components of the wireless device 302 may be coupled together by a bus system 322, which may include a power bus, a control signal bus, and a status signal bus in addition to a data bus.

In next generation Wireless Local Area Networks (WLANs), such as the WLAN system 100 from FIGS. 1-2, downlink (DL) MU-MIMO transmission may represent a promising technique to increase overall network throughput.

In most aspects of a DL MU-MIMO transmission, a non-beamformed portion of a preamble transmitted from an access point (e.g., the access point 110 from FIGS. 1-2 or the wireless device 302 from FIG. 3) to a plurality of user stations (e.g., the user terminals 120 from FIGS. 1-2) may carry a spatial stream allocation field indicating allocation of spatial streams to the stations (STAs).

In order to parse this allocation information at a station (STA) side, each STA may need to know its ordering or a STA number in a set of STAs from the plurality of STAs scheduled to receive the MU-MIMO transmission. This may entail forming groups, wherein a group identification (groupID) field in the preamble may convey, to the STAs, the set of STAs (and their order) being transmitted in a given MU-MIMO transmission. With preamble bits adding to the transmission overhead, it may be desirable to expend as little bits on the groupID as possible, while not sacrificing on the flexibility with which STAs can be scheduled together in a MU-MIMO transmission at a given instant.

Example Channel and/or Bandwidth Switch
Procedures for Wireless Network

Certain aspects of the present disclosure discuss procedures for switching bandwidths, channels, or both, used to communicate in a wireless network.

In certain aspects High Throughput (HT) communication may include using 20 MHz and 40 MHz channels. Very High Throughput (VHT) communication may include using 80 MHz only, 80+80 MHz and 160 MHz channels.

According to certain aspects, for HT communication, procedures for channel and/or bandwidth switch are defined in the 802.11 standard. For example, channel and/or bandwidth switching may be implemented via Channel Switch Announcement Elements/Frames and/or Extended Channel Switch Announcement Elements/Frames. These channel switch element(s)/frames are typically transmitted by an Access Point (AP) to announce an imminent switch of channel/bandwidth and to provide information relating to the switch.

In certain aspects, Channel Switch Announcement Elements and Extended Channel Switch Announcement Elements may utilize the same fields and functionalities, except that, in some cases, the Extended Element may utilize an additional field indicating the new operating bandwidth (e.g., in the event of a bandwidth switch).

In an aspect, the usage of the two switch elements may be similar. For example, an AP may include the Channel Switch Announcement Element or the Extended Channel Switch Announcement Element in a beacon to advertize a channel switch in advance. In an aspect, a Channel Switch Count field may indicate the time at which the switch will happen. The Extended element may allow switching to a new operating class.

The use of the Extended element may be subject to the STA(Station)/AP(Access Point) supporting the Extended Channel Switch operation mode as advertized in an Extended Capabilities Element included in the beacons or other advertizing frames.

A beacon may carry the Ch. Switch, Extended Ch. Switch, or both elements, depending on the capabilities of the STAs.

According to certain aspects, both elements may not carry indication of the new bandwidth after a switch. In an aspect, a Secondary Channel Offset Element may be used in conjunction with the Channel Switch Announcement Element to advertize the new bandwidth. In an aspect, the Extended Channel Switch Announcement may carry an indication of the operating class, which may allow identifying the primary/secondary channel offset within a 40 MHz channel after a switch, without using an explicit Secondary Channel Offset element.

Similarly, the Channel Switch Announcement Frame may include a Channel Switch Announcement plus a Secondary Channel Offset. An Extended Channel Switch Announcement Frame may include the same information as an Extended Channel Switch Announcement Element.

In certain aspects, the current procedures for channel/bandwidth switch applicable to HT cases may not be usable for VHT cases. For example, as the current standards do not define an 80+80 MHz operating class (indicating operation in two separate 80 MHz bandwidths), the Extended frame may not allow an indication of whether the channel width after the switch is 80+80 or 160 and identify the secondary 80 MHz. Thus, there is a need for methods to enable a channel/bandwidth switch for VHT systems.

In certain aspects, for VHT cases, a Wide Bandwidth Channel Switch Element may be utilized in conjunction with the switch announcement elements/frames, which may indicate the new bandwidth and center frequency of segment(s). For example, a Wide Bandwidth Channel Switch Element may be added to the Channel Switch Announcement Frame and the Extended Channel Switch Announcement Frame. Further, a Channel Number Field may indicate the position of the primary channel after switch.

A STA or AP may also change operation BW by sending a Notify Channel Width frame (HT) or a VHT Operating Mode Notification Frame. The Notify Channel Width may be sent as broadcast by the AP. It may be noted that by using the Extended Channel Switch Announcement, a VHT BSS can potentially transition to an operating class that does not support VHT operation.

According to certain aspects, A (Very High Throughput or VHT) AP may declare its channel width capability (80 MHz only or 80+80 MHz or 160 MHz) in a Supported Channel Width Set subfield of the VHT Capabilities element (e.g., as described in Table 8-ac13—Subfields of the VHT Capabilities Info field).

According to certain aspects, various rules may be implemented to define switching bandwidth and/or channels. For example, a VHT STA may not indicate support for 80+80 MHz unless it supports reception and transmission of 80+80 MHz PPDUs using all MCSs within the VHT BSS Basic MCS Set and all MCSs that are mandatory for the attached PHY.

In an aspect, a VHT STA may not indicate support for 160 MHz unless it supports reception and transmission of 160 MHz PPDUs using all MCSs within the VHT BSS Basic MCS Set and all MCSs that are mandatory for the attached PHY.

In certain aspects, a VHT STA may be required to set the Supported Channel Width Set in its HT Capabilities element to 1, indicating that both 20 MHz and 40 MHz operation is supported. In some cases, a VHT STA may set the Rx MCS Bitmask of the Supported MCS Set field of its HT Capabilities element according to the setting of the Rx MCS Map subfield of the VHT Supported MCS Set field of its VHT Capabilities element as follows: for each subfield Max MCS, for n SS of the Rx MCS Map field with a value other than 3 (no support for that number of spatial streams), the STA shall indicate support for MCSs 8(n−1) through 8(n−1)+7 in the Rx MCS Bitmask, where n is the number of spatial streams.

A VHT AP may set the STA Channel Width field in the HT Operation element and the Channel Width field in the VHT Operation element to indicate the BSS operating channel width as shown in Table 10-ac1 below:

TABLE 10-ac1

VHT BSS operating channel width

| HT Operation Element STA Channel Width Field | VHT Operation Element Channel Width Field | BSS Operating Channel Width |
| --- | --- | --- |
| 0 | 0 | 20 MHz |
| 1 | 0 | 40 MHz |
| 1 | 1 | 80 MHz |
| 1 | 2 | 160 MHz |
| 1 | 3 | 80 + 80 MHz |

Various other rules may also be enforced, such as the following: A STA that has a value of true for "dot11 VHT Option Implemented" shall set "dot11 High Throughput Option Implemented" to true. A VHT STA that is a member of a VHT BSS shall not transmit a 20 MHz VHT PPDU on a channel other than the primary 20 MHz channel of the BSS, except for a 20 MHz VHT PPDU transmission on an offchannel TDLS direct link. A VHT STA that is a member of a VHT BSS with a 40 MHz, 80 MHz, 160 MHz or 80+80 MHz operating channel width shall not transmit a 40 MHz VHT PPDU that does not use the primary 40 MHz channel of the BSS, except for a 40 MHz VHT PPDU transmission on an off-channel TDLS direct link. A VHT STA that is a member of a VHT BSS with an 80 MHz, 160 MHz or 80+80 MHz operating channel width shall not transmit an 80 MHz VHT PPDU that does not use the primary 80 MHz channel of the BSS, except for an 80 MHz VHT PPDU transmission on an off-channel TDLS direct link. A VHT STA that is a member of 160 or 80+80 MHz BSS shall not transmit an 160 or 80+80 MHz VHT PPDU that does not use the primary 80 MHz channel and the secondary 80 MHz channel of the BSS, except for an 160 or 80+80 MHz VHT PPDU transmission on an off-channel TDLS direct link.

According to certain aspects, a VHT STA may not transmit a PPDU containing frames addressed to another STA with a bandwidth wider than the one indicated in the Supported Channel Width Set subfield of the HT or VHT Capabilities element of both STAs. Further, a VHT STA may not transmit a PPDU containing one or more frames addressed to another VHT STA with a bandwidth wider than the one indicated by VHT Operating Mode Notification frame most recently received from the STA. An STA may not transmit a PPDU with a TXVECTOR parameter CH_BANDWIDTH indicating a channel bandwidth that is wider than the BSS operating channel width.

According to certain aspects, a VHT AP may announce a switch of operating channel, operating bandwidth, or both, by 1) using the Channel Switch Announcement Element, Channel Switch Announcement Frame or both or 2) using the Extended Channel Switch Announcement Element, Extended Channel Switch Announcement Frame or both, in conjunction with at least one of the Secondary Channel Offset Element and the Wide Bandwidth Channel Switch Element.

For example, when announcing a switch to a 80, 80+80 or 160 MHz operation bandwidth, either in conjunction with a channel switch or alone, the Secondary Channel Offset Element and the Wide Bandwidth Channel Switch Element may be present in the same frame as the Channel Switch Announcement element and Extended channel Switch Announcement element or within the Channel Switch Announcement Frame or Extended Channel Switch Announcement frame.

In an aspect, the presence or absence of the Secondary Channel Offset Element and the Wide Bandwidth Channel Switch Element with an switch announcement element/frame may indicate to a receiving STA if the channel/bandwidth switch is for a VHT case or not. For example, if an AP uses the Extended Channel Switch Announcement Frame for announcing an imminent switch of channel/bandwidth, the presence of the Secondary Channel Offset Element and the Wide Bandwidth Channel Switch Element within the Extended Channel Switch Announcement Frame may indicate that the switch relates to a VHT case. An absence of the Secondary Channel Offset Element and the Wide Bandwidth Channel Switch Element within the Extended Channel Switch Announcement Frame may indicate that the switch does not relate to a VHT case.

In certain aspects, a New Channel Number field in the Channel Switch Announcement Element, Extended Channel Switch Announcement Element, Channel Switch Announcement Frame or Extended Channel Switch Announcement Frame, may identify the primary 20 MHz channel after a switch. In an aspect, the value of the New Channel Number field may be set equal to dot11 Current Primary Channel (22.3.14 (Channelization)).

In certain aspects, when announcing a switch to a 40 MHz operation bandwidth, either in conjunction with a channel switch or alone, the Secondary Channel Offset Element shall be present in the same frame as the Channel Switch Announcement element. It may be noted that the indicated operating class within the Extended Channel Switch Announcement element or frame identifies the bandwidth and the relative position of the primary 20 MHz and secondary 20 MHz channels; hence a Secondary Channel Offset Element is not required.

In an aspect, when announcing a switch to an 80, 80+80 or 160 MHz channel by using the Extended channel Switch Announcement element or frame, the value of a New Operating Class field may identify the primary 40 MHz channel.

In certain aspects, it may be defined that when using the Channel Switch Announcement Element, if the Secondary Channel Offset Element and Wide Bandwidth Channel Switch element are both not present within the same frame, the operating bandwidth after the switch is 20 MHz.

According to certain aspects, movement of a BSS from one channel to a different channel or to a different operation bandwidth may be scheduled so that all STAs in the BSS, including STAs in power save mode, have opportunity to receive the information regarding the primary channel location and the operating bandwidth as described above.

It may be noted that use of the Extended Channel Switch Announcement element and frame may allow movement of the BSS to a new operating class that may not be within an operating class where a VHT STA is allowed to operate; in such a case, after the switch the new BSS may not be a VHT BSS.

In certain aspects, when switching the BSS to a lower operating bandwidth, the AP may recalculate the TS bandwidth budget and may delete one or more active TSs by invoking the MLME-DELTS_request primitive with a ReasonCode value of SERVICE_CHANGE_PRECLUDES_TS.

In certain aspects, a VHT STA that is a member of an IBSS may adopt the values indicated by the Secondary Channel Offset Element and Wide Bandwidth Channel Switch element in received frames according to the rules defined in 10.1.5 (Adjusting STA timers) and may not transmit a value for the Wide Bandwidth Channel Switch Element and Secondary Channel Offset Element that differs from the most recently adopted value.

Figure 4:
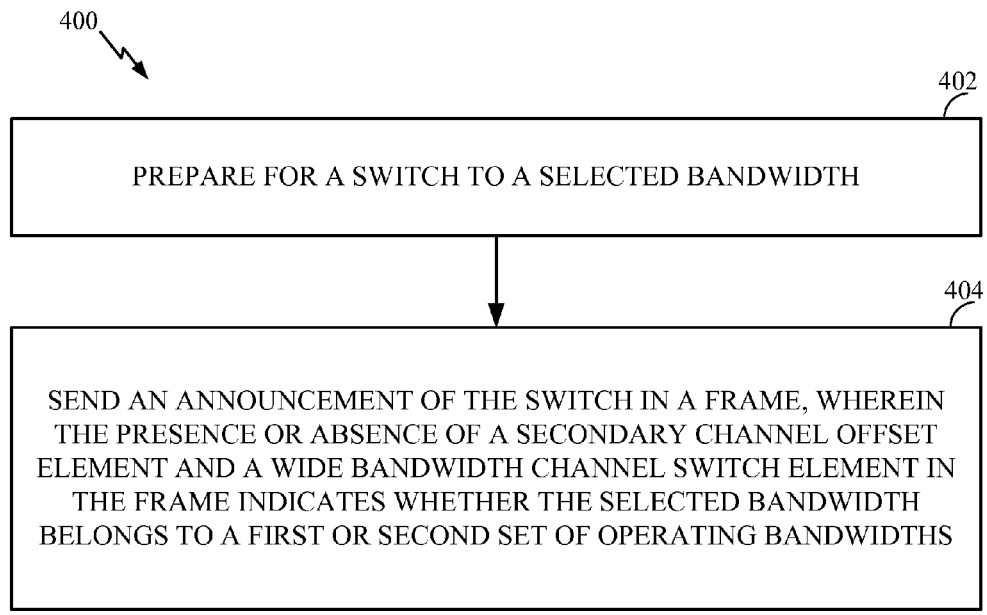
FIG. 4 illustrates example operations that may be performed by a transmitting STA for switching bandwidth in a VHT system, in accordance with certain aspects of the present disclosure.

FIG. 4 illustrates example operations 400 that may be performed by a transmitting STA for switching bandwidth in a VHT system, in accordance with certain aspects of the present disclosure. The transmitting STA may include an AP (e.g., AP 110) or any other wireless device (e.g., wireless device 302). Operations 400 may begin, at 402, by preparing for a switch to a particular bandwidth. At 404, an announcement of the switch may be sent in a frame, wherein the presence or absence of a Secondary Channel Offset Element and a Wide Bandwidth Channel Switch Element in the frame indicates whether the particular bandwidth (switched bandwidth) belongs to a first set of operating bandwidths or second set of operating bandwidths. In certain aspects, the presence of the Secondary Channel Offset Element and a Wide Bandwidth Channel Switch Element in the frame may indicate a switch to the first set of operating bandwidths. In an aspect, the first set of operating bandwidths may include VHT channels including 80 only, 80+80 and 160 MHz channels. In certain aspects, the absence of the Secondary Channel Offset Element and a Wide Bandwidth Channel Switch Element in the frame may indicate a switch to the second set of operating bandwidths. In an aspect, the second set of operating bandwidths may include 20 MHz and 40 MHz channels.

Figure 4A:
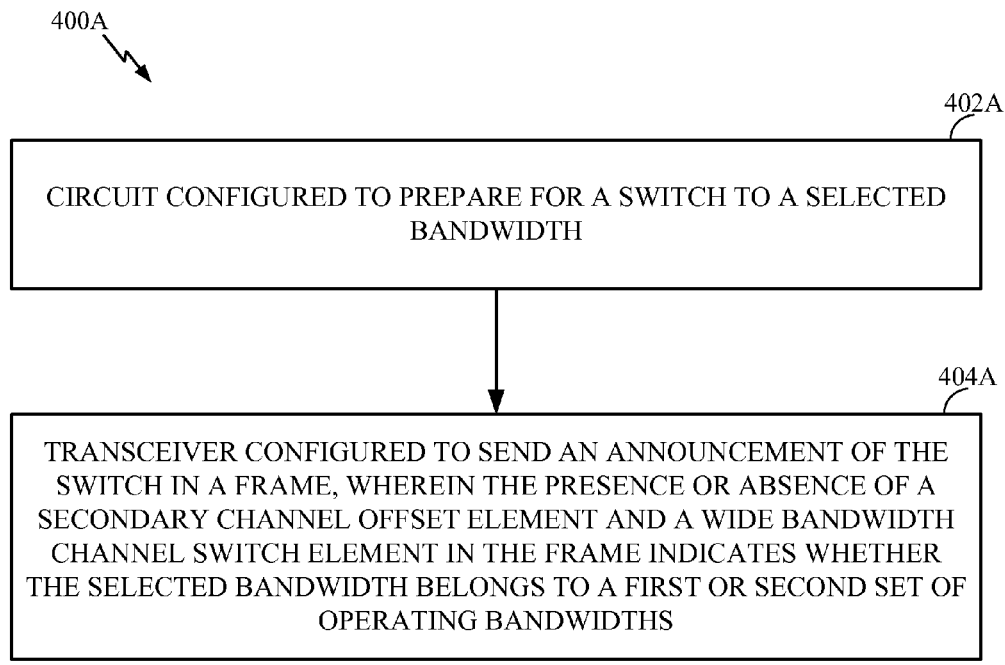
FIG. 4A illustrates example operations that may be performed at a transmitting STA for switching bandwidth in a VHT system using example components, in accordance with certain aspects of the present disclosure.

FIG. 4A illustrates example operations 400A that may be performed at a transmitting STA (e.g., at the access point 110 from FIG. 2 and/or at the wireless device 302 from FIG. 3) for switching bandwidth in a VHT system using example components, in accordance with certain aspects of the present disclosure. At 402A, a circuit may be configured to prepare for a switch to a particular bandwidth. At 404A, a transceiver may be configured to send an announcement of the switch in a frame, wherein the presence or absence of a Secondary Channel Offset Element and a Wide Bandwidth Channel Switch Element in the frame indicates whether the particular bandwidth belongs to a first or second set of operating bandwidths.

In certain aspects a receiving STA may receive the frame indicating the announcement of the switch to the particular bandwidth, and may determine whether the particular bandwidth belongs to the first or second set of operating bandwidths by detecting the presence or absence of the Secondary Channel Offset Element and the Wide Bandwidth Channel Switch Element in the frame. In certain aspects, if the receiving STA detects the presence of the Secondary Channel Offset Element and the Wide Bandwidth Channel Switch Element in the frame, it determines that a switch is to the first set of operating bandwidths. In an aspect, the first set of operating bandwidth may include VHT channels including 80 only, 80+80 and 160 MHz channels. In certain aspects, if the STA does not detect the presence of the Secondary Channel Offset Element and the Wide Bandwidth Channel Switch Element in the frame, it determines that the switch is to the second set of operating bandwidths. In an aspect, the second set of operating bandwidths may include 20 MHz and 40 MHz channels. The receiving STA may include a User Terminal (e.g., UT 120) or any other wireless device (e.g., wireless device 302).

Figure 5:
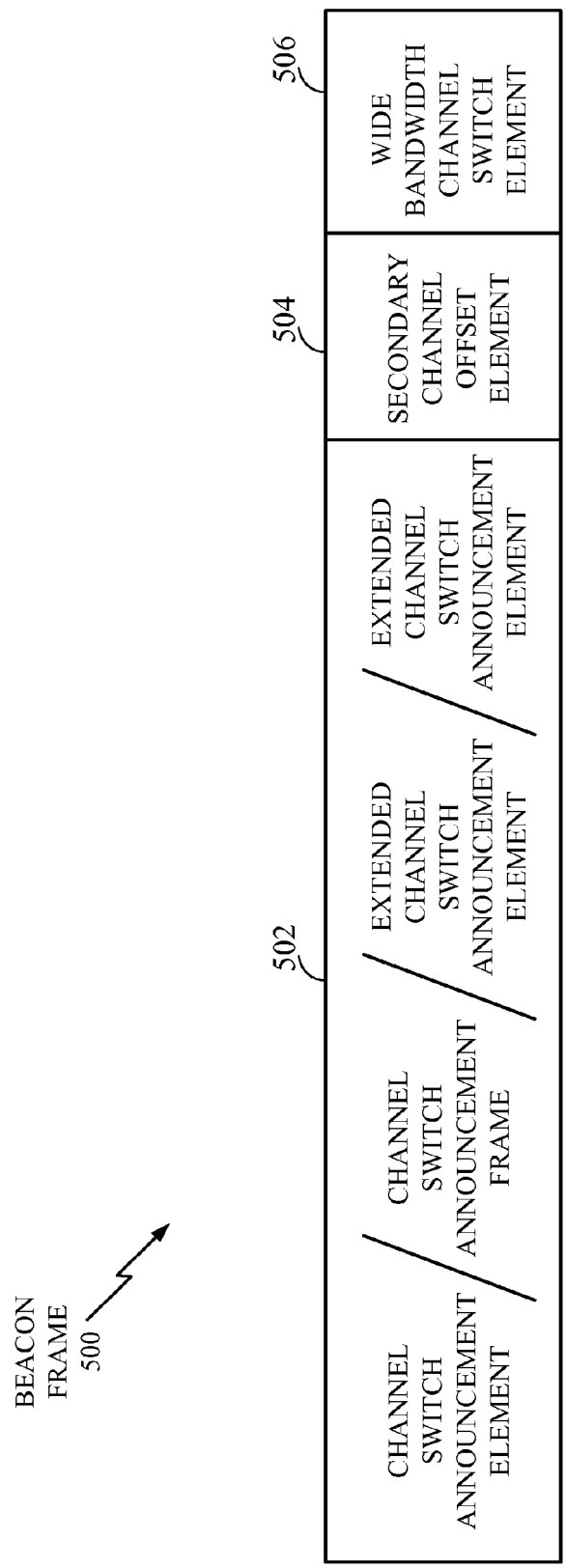
FIG. 5 illustrates an example beacon frame that may be transmitted by a transmitting STA for announcing a channel/Bandwidth in a VHT BSS, in accordance with certain aspects of the present disclosure.

FIG. 5 illustrates an example beacon frame 500 that may be transmitted by a transmitting STA for announcing a channel/Bandwidth in a VHT BSS. Field 502 of the beacon frame 500 may include any one of the Channel Switch Announcement Element, Channel Switch Announcement Frame, Extended Channel Switch Announcement Element or Extended Channel Switch Announcement Frame. Fields 504 and 506 of the beacon frame 500 may include a Secondary Channel Offset Element and a Wide Bandwidth Channel Switch Element respectively. As noted above, the presence of the Secondary Channel Offset Element and the Wide Bandwidth Channel Switch Element may indicate that the announced switch relates to VHT channels. On the other hand, absence of these elements may indicate that the announced switch does not relate to VHT channels.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding means-plus-function components with similar numbering. For example, operations 400 illustrated in FIG. 4 correspond to components illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuitry, individual or combination of circuits, and/or module(s). Generally, any operations illustrated in the Figures may be performed by corresponding functional means capable of performing the operations.

For example, the means for preparing may comprise an application specific integrated circuit, e.g., the controller 230 from FIG. 2 of the access point 110, or the processor 304 from FIG. 3 of the wireless device 302. The means for sending may comprise a transmitter, e.g., the transmitter 222 from FIG. 2 of the access point 110, or the transmitter 310 from FIG. 3 of the wireless device 302. The means for receiving may comprise a receiver, e.g., the receiver 254 from FIG. 2 of the user terminal 120, or the receiver 312 from FIG. 3 of the wireless device 302. The means for determining may comprise an application specific integrated circuit, e.g., the controller 280 from FIG. 2 of the user terminal 120, or the processor 304.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communications, comprising:
   a receiver configured to receive a frame indicating an announcement of a switch to a particular bandwidth; and
   a processing system configured to:
      determine whether the particular bandwidth belongs to a first or second set of operating bandwidths by:
         detecting a presence of a Secondary Channel Offset Element and a Wide Bandwidth Channel Switch Element, wherein the presence of the Secondary Channel Offset Element and the Wide Bandwidth Channel Switch Element in the frame indicates that the particular bandwidth belongs to the first set of operating bandwidths; or
         detecting an absence of the Secondary Channel Offset Element and the Wide Bandwidth Channel Switch Element, wherein the absence of the Secondary Channel Offset Element and the Wide Bandwidth Channel Switch Element in the frame indicates that the particular bandwidth belongs to the second set of operating bandwidths, wherein, if the particular bandwidth is determined to be in the first set of operating bandwidths, and if the frame includes an Extended Channel Switch Announcement Element or an Extended Channel Switch Announcement Frame, a New Operating Class field of the frame comprises information that identifies a primary 40 MHz channel to be used by the apparatus after the switch, the New Operating Class field being different than the Secondary Channel Offset Element and the Wide Bandwidth Channel Switch Element; and switch to the first or second set of operating bandwidths based on the determination.

2. The apparatus of claim 1, wherein the announcement of the switch to a bandwidth of the first set of operating bandwidths comprises an announcement of a channel switch.

3. The apparatus of claim 1, wherein the frame comprises a Channel Switch Announcement Frame or an Extended Channel Switch Announcement Frame.

4. The apparatus of claim 1, wherein the frame comprises at least one of a Channel Switch Announcement Element or an Extended Channel Switch Announcement Element.

5. The apparatus of claim 1, wherein the frame comprises a New Channel Number field comprising information that identifies a primary channel after the switch.

6. The apparatus of claim 1, wherein the first set of operating bandwidths comprises 80 MHz, 80+80 MHz and 160 MHz operating bandwidths.

7. The apparatus of claim 1, wherein the second set of operating bandwidths comprises 20 MHz and 40 MHz operating bandwidths.

8. The apparatus of claim 1, wherein the frame comprises a channel switch announcement element, and wherein the Secondary Channel Offset Element in conjunction with the channel switch announcement element is indicative of a switched bandwidth.

9. The apparatus of claim 1, wherein the Wide Bandwidth Channel Switch Element indicates a switched bandwidth and a center frequency.

10. A method for wireless communications performed by an apparatus, comprising:
receiving a frame indicating an announcement of a switch to a particular bandwidth;
determining whether the particular bandwidth belongs to a first or second set of operating bandwidths, wherein the determining comprises:
detecting a presence of a Secondary Channel Offset Element and a Wide Bandwidth Channel Switch Element, wherein the presence of the Secondary Channel Offset Element and the Wide Bandwidth Channel Switch Element in the frame indicates that the particular bandwidth belongs to the first set of operating bandwidths; or
detecting an absence of the Secondary Channel Offset Element and the Wide Bandwidth Channel Switch Element, wherein the absence of the Secondary Channel Offset Element and the Wide Bandwidth Channel Switch Element in the frame indicates that the particular bandwidth belongs to the second set of operating bandwidths, wherein, if the particular bandwidth is determined to be in the first set of operating bandwidths, and if the frame includes an Extended Channel Switch Announcement Element or an Extended Channel Switch Announcement Frame, a New Operating Class field of the frame comprises information that identifies a primary 40 MHz channel to be used by the apparatus after the switch, the New Operating Class field being different than the Secondary Channel Offset Element and the Wide Bandwidth Channel Switch Element; and
switching to the first or second set of operating bandwidths based on the determination.

11. The method of claim 10, wherein the announcement of the switch to a bandwidth of the first set of operating bandwidths comprises an announcement of a channel switch.

12. The method of claim 10, wherein the frame is a Channel Switch Announcement Frame or an Extended Channel Switch Announcement Frame.

13. An access terminal for wireless communications, comprising:
at least one antenna;
a receiver configured to receive, via the at least one antenna, a frame indicating an announcement of a switch to a particular bandwidth; and
a processing system configured to:
determine whether the particular bandwidth belongs to a first or second set of operating bandwidths by:
detecting a presence of a Secondary Channel Offset Element and a Wide Bandwidth Channel Switch Element, wherein the presence of the Secondary Channel Offset Element and the Wide Bandwidth Channel Switch Element in the frame indicates that the particular bandwidth belongs to the first set of operating bandwidths; or
detecting an absence of the Secondary Channel Offset Element and the Wide Bandwidth Channel Switch Element, wherein the absence of the Secondary Channel Offset Element and the Wide Bandwidth Channel Switch Element in the frame indicates that the particular bandwidth belongs to the second set of operating bandwidths, wherein, if the particular bandwidth is determined to be in the first set of operating bandwidths, and if the frame includes an Extended Channel Switch Announcement Element or an Extended Channel Switch Announcement Frame, a New Operating Class field of the frame comprises information that identifies a primary 40 MHz channel to be used by the apparatus after the switch, the New Operating Class field being different than the Secondary Channel Offset Element and the Wide Bandwidth Channel Switch Element; and
switch to the first or second set of operating bandwidths based on the determination.

14. An apparatus for wireless communications, comprising:
a processing system configured to generate a frame indicating an announcement of a switch to a particular bandwidth, wherein:
a presence of a Secondary Channel Offset Element and a Wide Bandwidth Channel Switch Element in the frame indicates that the particular bandwidth belongs to a first set of operating bandwidths;
an absence of the Secondary Channel Offset Element and the Wide Bandwidth Channel Switch Element in the frame indicates that the particular bandwidth belongs to the second set of operating bandwidths; and
if the announcement indicates a switch to the first set of operating bandwidths, and if the frame includes an Extended Channel Switch Announcement Element or an Extended Channel Switch Announcement Frame, a New Operating Class field of the frame comprises information that identifies a primary 40 MHz channel to be used by the apparatus after the switch, the New Operating Class field being different than the Secondary Channel Offset Element and the Wide Bandwidth Channel Switch Element; and
a transmitter configured transmit the frame.

15. The apparatus of claim 14, wherein the announcement of the switch to a bandwidth of the first set of operating bandwidths comprises an announcement of a channel switch.

16. The apparatus of claim 14, wherein the frame comprises a Channel Switch Announcement Frame or an Extended Channel Switch Announcement Frame.

17. The apparatus of claim 14, wherein the frame comprises at least one of a Channel Switch Announcement Element or an Extended Channel Switch Announcement Element.

18. The apparatus of claim 14, wherein the frame comprises a New Channel Number field comprising information that identifies a primary channel after the switch.

19. The apparatus of claim 14, wherein the first set of operating bandwidths comprises 80 MHz, 80+80 MHz and 160 MHz operating bandwidths.

20. The apparatus of claim 14, wherein the second set of operating bandwidths comprises 20 MHz and 40 MHz operating bandwidths.

21. The apparatus of claim 14, wherein the frame comprises a channel switch announcement element, and wherein the Secondary Channel Offset Element in conjunction with the channel switch announcement element is indicative of a switched bandwidth.

22. The apparatus of claim 14, wherein the Wide Bandwidth Channel Switch Element indicates a switched bandwidth and a center frequency.

23. The apparatus of claim 14, further comprising at least one antenna, wherein the transmitter is configured to transmit the frame via the at least one antenna, and wherein the apparatus is configured as an access point.

24. A method for wireless communications performed by an apparatus, comprising:
  generating a frame indicating an announcement of a switch to a particular bandwidth, wherein:
    a presence of a Secondary Channel Offset Element and a Wide Bandwidth Channel Switch Element in the frame indicates that the particular bandwidth belongs to a first set of operating bandwidths,
    an absence of the Secondary Channel Offset Element and the Wide Bandwidth Channel Switch Element in the frame indicates that the particular bandwidth belongs to the second set of operating bandwidths; and
    if the announcement indicates a switch to the first set of operating bandwidths, and if the frame includes an Extended Channel Switch Announcement Element or an Extended Channel Switch Announcement Frame, a New Operating Class field of the frame comprises information that identifies a primary 40 MHz channel to be used by the apparatus after the switch, the New Operating Class field being different than the Secondary Channel Offset Element and the Wide Bandwidth Channel Switch Element; and
  transmitting the frame.

25. The method of claim 24, wherein the announcement of the switch to a bandwidth of the first set of operating bandwidths comprises an announcement of a channel switch.

26. The method of claim 24, wherein the frame is a Channel Switch Announcement Frame or an Extended Channel Switch Announcement Frame.

27. The method of claim 24, wherein the frame comprises at least one of a Channel Switch Announcement Element or an Extended Channel Switch Announcement Element.

28. The method of claim 24, wherein the frame comprises a New Channel Number field comprising information that identifies a primary channel after the switch.

29. The method of claim 24, wherein the first set of operating bandwidths comprises 80 MHz, 80+80 MHz and 160 MHz operating bandwidths.

30. The method of claim 24, wherein the second set of operating bandwidths comprises 20 MHz and 40 MHz operating bandwidths.

31. The method of claim 24, wherein the frame further comprises a channel switch announcement element, and wherein the Secondary Channel Offset Element in conjunction with the channel switch announcement element is indicative of a switched bandwidth.

32. The method of claim 24, wherein the Wide Bandwidth Channel Switch Element indicates a switched bandwidth and a center frequency.

* * * * *